United States Patent [19]

Mason

[11] 4,003,064
[45] Jan. 11, 1977

[54] MULTI-PURPOSE FILM CASSETTE PROCESSOR HAVNG SLIDEABLE NOZZLE PLATE

[75] Inventor: Paul B. Mason, Magnolia, Mass.
[73] Assignee: Polaroid Corporation, Cambridge, Mass.
[22] Filed: Dec. 23, 1974
[21] Appl. No.: 535,184
[52] U.S. Cl. .................. 354/88; 352/130; 354/317
[51] Int. Cl.² ............................ G03B 17/50
[58] Field of Search .............. 354/83, 84, 85, 88, 354/317; 352/130, 72, 78 R

[56] References Cited
UNITED STATES PATENTS

| 3,641,896 | 2/1972 | Downey | 352/130 |
|---|---|---|---|
| 3,851,958 | 12/1974 | Land | 352/130 |

Primary Examiner—Monroe H. Hayes
Attorney, Agent, or Firm—David R. Thornton

[57] ABSTRACT

A processor for multi-purpose film cassettes of the type containing photographic film during exposure, processing and projection, the processor having a nozzle plate slideable from an initial processing position in which a nozzle opening therein is aligned with a discharge nozzle opening in an initially sealed processing fluid reservoir opening to a projection position in which the nozzle plate seals the reservoir discharge opening. A pressure pad supported by spring means biases the film toward the nozzle plate during processing and is cooperable with the nozzle plate to effect a separation of the nozzle plate and pressure pad to allow unobstructed passage of the film strip during projection subsequent to processing. Means are provided for indicating electrically whether the film strip is processed or unprocessed, such means including either a conductive strip attachable to a pull strip for releasing the processing fluid or a pivotal arm blocked by such a pull strip to effect a change in circuit continuity between a pair of electric terminals on initiation of the processing cycle.

29 Claims, 14 Drawing Figures

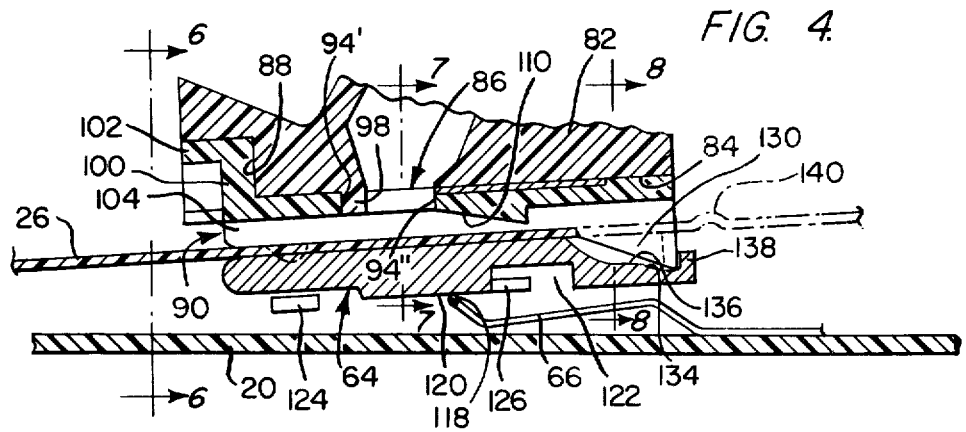

MULTI-PURPOSE FILM CASSETTE PROCESSOR HAVNG SLIDEABLE NOZZLE PLATE

BACKGROUND OF THE INVENTION

This invention relates to multi-purpose film cassettes of the type in which a photographic film strip is exposed, processed and projected without removal from the cassette and, more particularly, it concerns a novel processing unit for such cassettes.

U.S. Pat. No. 3,641,896 issued to Rogers B. Downey et al on Feb. 15, 1972 and U.S. Pat. Nos. 3,778,140 and 3,800,306 issued respectively on Dec. 11, 1973 and Mar. 26, 1974 to Edwin H. Land contain exemplary disclosures of a motion picture system by which a supply of light sensitive film contained in a multi-purpose cassette can be exposed in a camera adapted to receive the cassette and then processed or developed to provide the conventional series of positive transparent image frames by placing the cassette in a viewing apparatus capable of activating a processor also contained in the cassette. Thus, once the film strip has been exposed, the image sequence recorded thereon may be viewed by projection after a time interval only as long as that required to rewind the film strip and during which the processing operation is performed.

Of the many components required for satisfactory operation of such systems, the film cassette and the processor contained therein are perhaps most critical. For example, the development of transparent image frames on the light sensitive emulsion of the film strip after exposure in the camera of the system requires the deposit of processing fluid on the film strip. This is accomplished by expressing processing fluid through an orifice to a moving run of the film strip during the processing cycle. After the processing fluid is released upon initiation of the processing cycle, it must be deposited uniformly across the width of the emulsion as well as uniformly along the full useful length of the film strip with a high measure of reliability inasmuch as any non-uniformity or discontinuity in the layer of processing fluid deposited on the film strip will result in undesirable blemishes plainly observable in the images to be viewed. When the processing operation has been completed, any excess processing fluid within the cassette must be secured against leakage to the overall cassette interior. Finally, provision is made in the cassette for indicating whether the film strip has been processed or not inasmuch as the operating mode of the viewing apparatus in which the cassette is inserted after exposure is different for a cassette containing an exposed unprocessed film strip than it is for the same cassette containing an exposed and processed film strip.

In addition to the functional importance of the cassette contained components in the operation of the system, the cassette is preferably a package for both the supply of film and the processing fluid from the point of manufacture to use by the consumer. The cassette also serves as a permanent container for the exposed and processed film strip during storage and subsequent projection cycles. In this respect, therefore, the processing components contained in the cassette can be considered as disposable in light of their being used only once with each cassette manufactured. This aspect of the cassette adds a still further requirement; that is, that the processing components be inexpensive and capable of mass production techniques without in any way detracting from operational performance in effecting the processing operation. Although the cassette structure illustrated in the above-mentioned U.S. patents as well as other patents and pending applications commonly owned by the assignee of the present invention have evidenced great potential from the standpoint of achieving system objectives, there is a need for simplification and corresponding cost reduction particularly in the once used cassette components which must be capable of mass production manufacturing techniques.

SUMMARY OF THE INVENTION

In accordance with the present invention, the components required in such multi-purpose film cassettes for depositing and doctoring processing fluid uniformly onto the emulsion surface of the elongated film strip during processing, sealing the supply of processing fluid on completion of the processing cycle, indicating the completion of the processing cycle and conditioning the used or spent processing components in the cassette for subsequent projection of the processed film strip are significantly simplified by slideable nozzle plate and pressure pad assembly moveable from an initial "exposure-process" positional relationship to a final "projection" positional relationship by film movement reversal after completion of the processing cycle. Preferably, the nozzle plate and pressure pad assembly is placed in the initial position during manufacture and loading of the film strip into the cassette. The assembly is retained in that initial position against forward movement (in the direction of film strip travel during exposure thereof) by the actuating means of the processor. That is, in the illustrated embodiment, obstruction to such forward movement is provided by a pull strip, located in the processor for removing a tear tab closure, to release processing fluid from an initially sealed supply reservoir at the start of the processing cycle. During the processing operation when the film strip is rewound in a direction the reverse of that in which it is exposed and projected, the initial positioning of the nozzle plate and pressure pad assembly is retained against rearward movement with the film strip by abutment stops fixed in the cassette interior.

Upon completion of the processing cycle and, more particularly, at the initation of a subsequent projection cycle wherein the direction of film strip movement is again forward, and with the pull strip which previously blocked forward movement of the nozzle plate and pressure pad assembly now removed, the assembly is carried through an increment of movement with the film strip to its final position in which the nozzle plate opening through which processing fluid had been deposited onto the film strip is shifted out of registry to seal the processing fluid reservoir. Also, a portion of the reservoir structure against which the nozzle plate slides depends into the nozzle plate aperature and functions to sweep any residual processing fluid from the nozzle plate opening during this increment of movement.

The pressure pad component is interconnected with the nozzle plate in a manner such that is carried forward with the nozzle plate and then released so as to space the pressure pad from the nozzle plate and thereby permit free passage of the film strip. In this arrangement, a supporting spring having as its principal function the provision of a yieldable biasing force by which the pressure pad supports the film strip below a doctoring surface which spreads the processing fluid also functions after processing to retain the nozzle in tight sealing engagement with the bottom opening of the processing fluid reservoir.

Provision is also made for electrically indicating for processed or unprocessed state of the film strip within the cassette by separating components of an initially continuous circuit in the cassette housing at the initiation of the processing cycle. Preferably, the indicating means is also controlled by the processor actuator means, or, that is, in the illustrated embodiments by the pull strip. In one embodiment, a conductive strip attached to the tear tab pull strip provides initial circuit continuity between a pair of terminals in the cassette housing and is removed with the pull strip upon the initiation of the processing cycle to effect a circuit discontinuity and thus indicate the subsequent processed condition of the film strip in the cassette. In another embodiment, movement of the pull strip releases a pivotal arm which is displaced under the bias of a pair of spring contacts and permits opening of the circuit continuity therebetween.

Accordingly, among the objects of the present invention are: the provision of an improved processor for multi-purpose cassettes of the type in which a photosensitive film strip is exposed, processed and projected without removal from the cassette; the provision of such an improved processor by which the complexity of the processing fluid applying components is reduced as compared with prior processors while at the same time maintaining or enhancing the efficiency of the processor; the provision of such a processor by which an initially sealed reservoir in which processing fluid is supplied may be opened to allow processing fluid to be applied to a moving run of the film strip during the processing operation and effectively resealed to prevent spillage of excess processing fluid within the cassette after processing; the provision of such an improved processing which enables enhanced handling of residual processing fluid contained in the cassette on completion of a processing cycle; the provision in such a processor of an improved, multi-function sliding nozzle plate and pressure pad assembly moveable from an initial processing interrelationship to a final projection interrelationship in which the nozzle plate and pressure pad components present no interference to movement of the film strip during subsequent repeated projection cycles; the provision of such a processor having a highly effective and simplified arrangement for electrically indicating the processed or unprocessed condition of the cassette in which the processor is located; and the provision of such an improved processor which lends itself to conventional manufacturing techniques, is low in cost and capable of tolerance levels required for highly effective operation.

Other objects and further scope of applicability of the present invention will become apparent from the detailed description to follow taken in conjunction with the accompanying drawings in which like reference numerals designate like parts.

BRIEF DESCRIPTION OF THE DRAWINGS

FIG. 4 is an enlarged fragmentary cross-section taken on line 4—4 of FIG. 2;

FIG. 5 is a cross-section similar to FIG. 4 but illustrating components in a different operating condition;

FIGS. 6, 7 and 8 are fragmentary cross-sections taken respectively on lines 6—6, 7—7 and 8—8 of FIG. 4;

DESCRIPTION OF THE PREFERRED EMBODIMENTS

Figures 1, 2, 3:
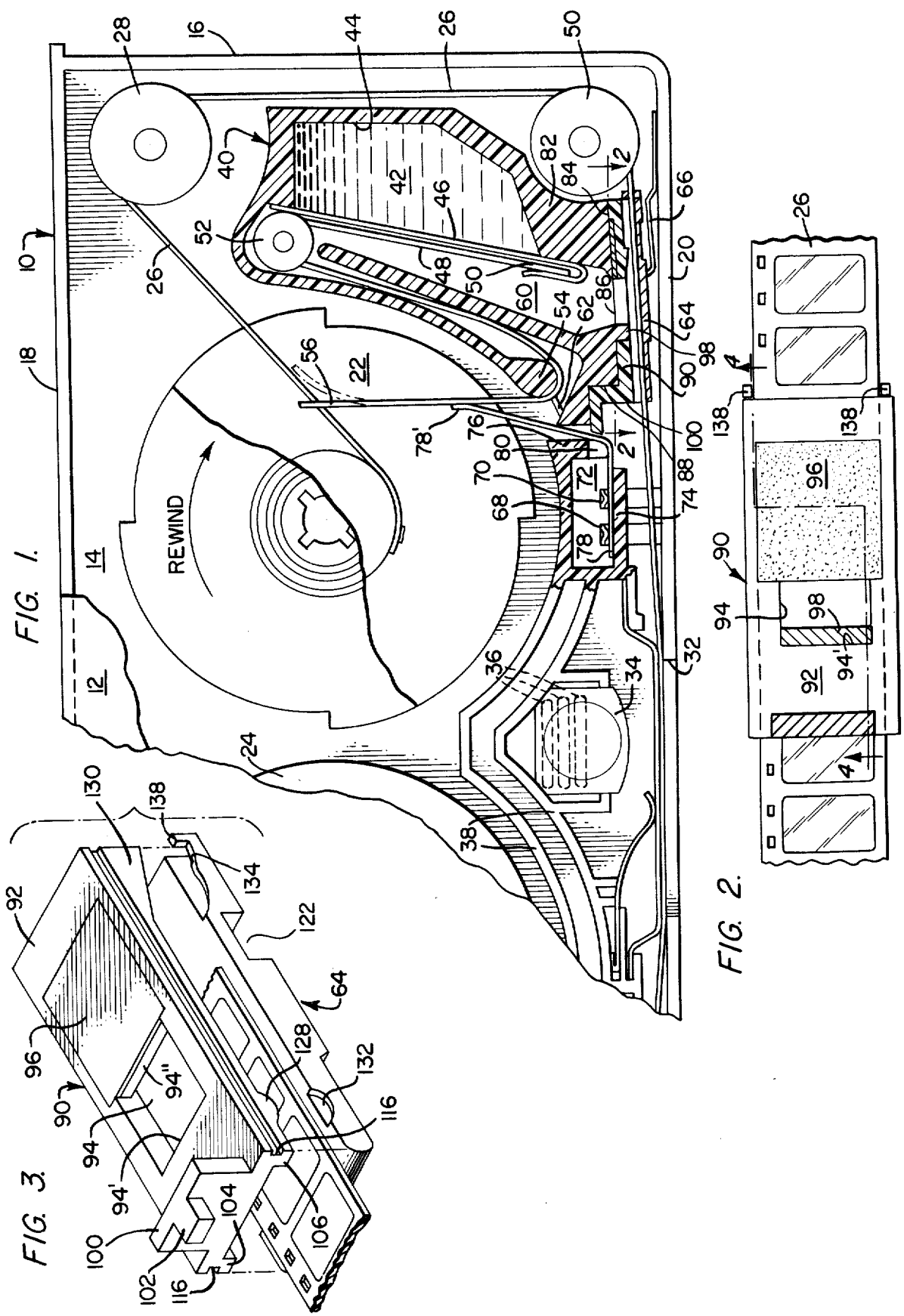
FIG. 1 is a fragmentary sectional view illustrating a multi-purpose film cassette incorporating one embodiment of the present invention.
FIG. 2 is an enlarged fragmentary cross-section taken along line 2—2 of FIG. 1.
FIG. 3 is an exploded perspective view illustrating the improved nozzle plate and pressure pad assembly of the present invention.

The multi-purpose film cassette with which the apparatus of the present invention is particularly adapted for use is illustrated in FIG. 1 to include an outer housing 10 in the shape of a rectangular parallelpiped having front and back walls 12 and 14 respectively, end walls 16, a top wall 18 and a bottom wall 20. Mounted for rotation between the front and back walls are supply and take-up spools 22 and 24 to which supply and take-up leader ends of a film strip 26 are affixed by appropriate means. In passing from the supply spool 22 to the take-up spool 24, the film strip 26 is trained through a series of runs defined in part by idler rolls 28 and 30. As shown, the film strip 26 is trained over an opening 32 in the bottom wall 20 both for exposure in an appropriate camera (not shown) and also for projection in a viewer or projector (also not shown) by illumination passed through a reflecting prism lens 34 mounted in the cassette behind the opening 32 and the film strip run passing thereover. Situated behind the prism 34 and air vent openings 36 in the rear wall 14 to enable the circulation of air over the prism 34 for cooling and also for drying after film strip processing in the manner to be described below. Both the air vents 36 and the prism 34 are isolated from the supply and take-up spools 22 and 24 by a labyrinth-type light seal formed in part by internal ribs 38.

Also contained in the cassette housing 10 is a processor generally designated by the reference numeral 40 and operative after exposure of the film strip 26 to deposit a layer of processing fluid 42 onto the emulsion side of the film strip and over the entire length thereof. The processor includes a reservoir 44 in which the processing fluid 42 is initially sealed by a tear tab closure 46 secured over a planar opening in the reservoir. Although the fluid chamber 44 is shown in FIG. 1 to be established by an integral processor construction, cassette manufacture in practice is facilitated by the use of a separate pod adapted to be received in the processor, the pod being loaded with the processing fluid 42 and having affixed thereto the tear tab closure 46.

To enable release of the initially sealed processing fluid 42 from the chamber 44 after exposure of the film strip 26, a pull strip 48 having one end 50 releasably secured to the tear tab closure 46 is trained about a guide roller 52 and a radius wall portion 54 so that a free end 56 of the pull strip may be engaged by an aperture (not shown) in the supply spool end of the film strip 26 upon initial rewind movement thereof. The operation of the pull strip 48 is described fully in a copending application Ser. No. 428,377, filed Dec. 26, 1973, by Joseph A. Stella et al and assigned to the assignee of the present invention. In essence, the free end portion 56 of the pull strip 48 will ride against the film strip 26 in the position illustrated in phantom lines in FIG. 1 as the film strip is payed from the supply spool 22 to the take-up spool 24 during exposure of the film strip. Reversal of the film strip during rewind, however, will effect an attachment of the pull strip to the supply end leader of the film strip so that the pull strip will be wound with the film on the supply spool. As a consequence, the tear tab closure 46 will be drawn away from the reservoir opening to release the processing fluid 42 to a second chamber 60 in the processor. An edge 62 opposite from the radius portion 54 will cause the tear tab 46 to release from the pull strip 48 so that the tear tab 46 will not be carried with the pull strip 48 within the convolutions of film wound on the supply spool 22.

The bottom of the chamber 60 opens to the upwardly facing emulsion side of the film strip 26 in a manner to be described in more detail below. Also, a pressure pad 64 supported by a spring 66 retains the film strip in operative relation to the bottom of the chamber 60 during processing.

It is to be noted that the multi-purpose cassette and components described in the preceding paragraphs represent a cassette structure which, in itself, is not novel with the present invention. It is important to a full understanding of the present invention, however, that the characteristics and operation of the cassette illustrated in FIG. 1 be understood. Specifically, after exposure of the film strip by incremental advance thereof past the opening 32 in a direction proceeding from the supply spool 22 to the take-up spool 24, a processing operation is initiated by driving the supply spool to rewind the film strip from the take-up spool 24 back onto the supply spool 22. This procedure is effected by removing the cassette from the camera in which it is exposed and placing it in a viewer device (not shown) equipped with appropriate means for driving the supply spool 22 to rewind the film strip 26 in the manner described. During such rewinding movement, the emulsion side of the film strip will be drawn past the processor 40 to receive a layer of processing fluid now released from the chamber 44 as a result of the closure 46 having been removed in the manner described above. Subsequent to processing in this manner, the film strip is advanced incrementally, frame by frame, past the opening 32 and the prism lens 34 for the projection of successive image frames in a manner well known in the motion picture art.

As disclosed in the aforementioned U.S. patents, the viewer in which the cassette is mounted both for processing and for projection, although not shown in the drawings, is equipped with an automatic control system by which the cassette is operated either in a rewind processing mode automatically upon insertion of the cassette into the viewer or through a project rewind cycle depending on whether the film strip 26 has been processed or not. To provide such an indication of the state of the film strip 26 within the cassette housing 10, the viewer control circuitry will in practice be electrically connected upon such cassette insertion with a pair of spaced terminals 68 and 70 extending from the cassette exterior at the outside of the rear wall 14. In the embodiment illustrated in FIGS. 1–8 of the drawings, the terminals 68 and 70 extend to be located within a chamber 72 established in the cassette housing interior by molded transverse wall portions including a deck portion 74 terminated short of and thus establishing an opening with an end wall 76. The terminals 68 and 70 extend into the chamber 72 over the deck portion 74 and are electrically interconnected with each other by a flexible conductive strip 78 initially supported between the contacts of the terminals 68 and 70 and the floor portion 74. As shown in FIG. 1, the conductive strip 78 extends through the opening between the floor portion 74 and the end wall 76 upwardly about the exterior of the wall portion 76 to an end 78' at which it is connected to the pull strip 48. In addition, it will be noted that the lower end of the wall portion 76 is provided with a downwardly opening notch 80, the transverse width of which is less than the width of the conductive strip 78 so that the initial position of the components illustrated in FIG. 1, the notch 80 is covered by the conductive strip 78.

In light of the organization of the terminals 68 and 70, the conductive strip 78, as well as the wall portions defining the chamber 72, it will be apparent that circuit connections with the terminals 68 and 70 exteriorly of the cassette will be continuous only so long as the conductive strip 78 extends between the contacts 68 and 70 as shown in FIG. 1. However, when the processing cycle is initiated by rewind rotation of the supply spool 22 to engage the pull strip 48, the conductive strip 78 will be withdrawn with the pull strip 48 to effect a discontinuity in the circuit established in part by the contacts 68 and 70. In addition, the removal of the conductive strip 78 with the pull strip 48 will expose the notch 80 in the wall portion 76.

As shown most clearly in FIGS. 1 and 4–8 of the drawings, the structure of the processor 40 establishing the chambers 44 and 60 is provided with a base portion 82 shaped to establish a generally planar, downwardly facing or bottom surface 84 having a rectangular opening 86 through which processing fluid in the chamber 60 passes onto the film strip 26 and terminating forwardly in a stepped vertical abutment ledge 88. In accordance with an important feature of the present invention, a nozzle plate, generally designated in the drawings by the reference numeral 90, is retained slideably against the surface 84 in the base 82 of the processor 40. The configuration of the nozzle plate 90 is illustrated in FIGS. 2-8 of the drawings to include a generally planar and rectangular top surface 92 to engage the downwardly facing planar surface 84 at the base 82 of the processor and in which a rectangular nozzle opening 94 is formed forwardly of an upwardly facing sealing pad 96 of absorbent material recessed in the upper surface 92. As shown in FIGS. 2–4, for example, the transverse dimension of the nozzle opening 94 is essentially the same as the corresponding dimension of the opening 86 through the bottom surface 84 of the processor 40. The longitudinal dimension of the nozzle opening 94 is slightly greater than the length of the openings 86 so that a sweeper abutment 98, depending integrally from the base 82 of the processor, may extend downwardly through the forward end 94' of the nozzle opening. The rearward edge 94" of the opening is coextensive with the rear edge of the opening 86 in the processing base 82. The dimensions of the absorbent pad 96, as shown in FIGS. 2 and 3 are somewhat greater than the dimensions defining the area of the opening 86. The upwardly presented configuration of the nozzle plate 90 is completed by an upstanding wall portion 100 (see FIG. 3) shaped to complement the forward end of the processor base portion 82 including the stepped ledge 88 thereof. The wall portion 100 supports a forwardly projecting lug 102 having a transverse dimension smaller than the transverse dimension of the notch 80 in the wall portion 76 and cooperable therewith in a manner to be described in more detail below.

The u-shaped surface configuration of the nozzle plate 90 may be appreciated by reference to FIGS. 3–8 of the drawings. As shown, a tunnel-like configuration with the upwardly facing emulsion side of the film strip 26 is established by a pair of depending sides 104 and 106 extending the length of the nozzle plate 90 on the underside thereof. Although the downwardly facing surface of the nozzle plate spanning between the sides 104 and 106 is generally planar and elevated with respect to the upper surface of the film strip 26 as a result of the vertical dimension of the sides, a portion of the nozzle plate to the rear of or following the nozzle opening 94, in the context of the film strip movement during rewind, depends downwardly from the elevated plane to establish inclined doctoring surface 110. The provision of the inclined doctoring surface 110, in itself, and its function in the application of the processing fluid 42 as a uniform coating over the emulsion surface of the film strip is disclosed in copending application Ser. No, 360,678 filed May 16, 1973, by Edward F. Burke et al and therefore not in itself novel with the present invention. Provision of the inclined doctoring surface 110 in the sliding nozzle plate 90, however, is important to the objectives of the present invention.

As shown most clearly in FIGS. 3, 6 and 7 of the drawings, the nozzle plate 90 is supported for sliding movement against the bottom surface 84 of the processor base 82 by inwardly projecting rails 112 at the bottom of wall portions 114 depending from the processor base 82. The rails 112 engage in longitudinal grooves 116 formed along the side edges of the nozzle plate 90. For reasons which will become apparent from the description following below, the organization of the rails 112 and grooves 116 is not essential to full support of the nozzle plate 90 against the under surface 84 of the processor base 82. Provision of this means or its equivalent serves to stabilize and guide movement of the nozzle plate 90 as well as provide a measure of support therefor in its position against the bottom of the processor base.

As mentioned above, the function of the pressure pad 64 and of the spring 66 is basically disclosed in the aforementioned U.S. patents as supporting the film strip 26 during passage thereof under the nozzle opening 94 and to oppose or balance the hydrodynamic pressure forces developed in the processing fluid by the inclined doctoring surface 110. While this function of the pressure pad 64 is important to a proper processing of the film strip after exposure, it is equally important that the film strip be freed of any drag which may be imposed between the rails 104 and 106 and the pressure pad 64 during repeated subsequent projection cycles in which the film strip is advanced and rewound between the supply and take-up spools 22 and 24. In accordance with the present invention, these functions of the pressure pad 64 are achieved as a result of structural features embodied in the nozzle plate 90, the pressure pad 64, and the spring 66 as well as components of the processor base 82 and cassette housing 10. Specifically, and as shown in FIGS. 3–5 of the drawings, the spring 66, though formed of spring wire, functions in the nature of a leaf spring cantilevered from the bottom wall 20 of the cassette housing 10 and provided at its free end with an upwardly inclined pressure pad supporting portion 118. The pressure pad 64 is provided intermediate its length with a downwardly facing and generally planar spring bearing surface 120 against which the supporting end 118 of the spring 66 engages initially and at all times during the processing cycle. The bearing surface 120 terminates at its rear edge portion in a downwardly opening transverse notch 122. As shown in FIGS. 4–7, two pairs of inwardly projecting lugs 124 and 126 are provided in the front and rear walls walls 12 and 14 of the cassette housing and which are positioned to underlie the pressure pad 64. As shown in FIGS. 4 and 5, the longitudinal dimension of the lug pair 126 is related to the fore and aft dimension of the notch 122 so that movement of the pressure pad 64 in a direction parallel to film strip travel is limited by engagement of the front and rear edges of the notch 122 with opposite sides of the lugs 126. Also it will be noted that when the pressure pad 64 is supported by engagement of the supporting end of the spring 118 with the bearing surface 120, the corresponding bottom surfaces of the pressure pad 64 are spaced above the lugs 124 and 126 as shown in FIG. 4.

As shown in FIGS. 3–5, the outer edges of the rails 104 and 106 of the nozzle plate 90 overhanging opposite side edges of the film strip 26 are provided with depending cam surfaces 130 which initially lie at the lowermost portions of a pair of ramps designated at 134 formed in the sides of the pressure pad 64. The rearwardly located ramps 134 are shown to include a forward ledge portion 136 and terminate rearwardly in an upstanding abutment tang 138. In light of this organization it will be appreciated that forward movement of the nozzle plate 90 relative to the pressure pad 64 will cause the depending cam portions 130 on the nozzle plate 90 to depress the pressure pad 64 downwardly as a result of the camming action against the ramps 134.

In light of the structural characterisitcs described, the operation of the improved processor of the present invention may now be understood. As mentioned above, at the time of cassette manufacture and loading thereof with the film strip 26, the film strip will be wound in convolutions on the supply spool 22 with a take-up leader extending about the guide rollers 28 and 30 past the processor 40 and opening 32 to the take-up spool 24. Also at this time, the condition and positional interrelationship of the tear tab 46, the pull strip 48 as well as the conductive strip 78 will be essentially as shown in FIG. 1 of the drawings. Also at this time, the nozzle plate 90 and the pressure pad 64 will be in the position illustrated in FIGS. 1 and 4 of the drawings or in an expose-process positional interrelationship. Because the spring 66 in effect captures the film between the pressure plate 64 and the depending sides 104 and 106 of the nozzle plate 90, advanced movement of the film strip 26 during exposure in a camera will have a tendency to advance the nozzle plate and the pressure pad 64 forwardly in the direction of film advance during exposure. Any such movement of the nozzle plate and pressure pad during exposure, however, is prevented by engagement of the forwardly projecting lug 102 with the conductive strip 78 which at this time blocks the opening 80 in the wall portion 76. Also at this time forward movement of the pressure pad 64 is prevented by the abutment tangs 138 engaging the rear end of the cam portions 130.

After exposure, the film strip 26 will be wound on the take-up spool 24 and ready for processing by insertion of the cassette into the viewing apparatus (not shown). Upon insertion of the cassette into such a viewer, the circuit continuity between the contacts 68 and 70 will program the control system of the viewer to effect a processing rewind of the film strip 26 back onto the supply spool 22. As soon as such processing rewind movement of the film strip is initiated, the supply end leader of the film strip engages the pull strip 48 to withdraw the pull strip and the conductive strip 78 and wind them in the initial convolutions of the supply leader end of the film strip onto the supply spool 22. The tear tab closure 46 will at this time be removed allowing the processing fluid 42 to flow into the chamber 60 and downwardly through the nozzle plate opening 94 onto the emulsion surface of the film strip 26. Any tendency for the nozzle plate 90 or the pressure pad 64 to be drawn rearwardly with the film strip 26 at this time is prevented by engagement of the abutment surface 88 by the upstanding wall 100 on the nozzle plate 90 and by engagement of the forward edge of the notch 122 in the pressure pad with the inwardly projecting lug pair 126.

Upon complete rewind of the film strip on the supply spool 22 and corresponding completion of the processing cycle, the viewing apparatus operates to initiate a mandatory projection cycle during which the processed film strip is advanced incrementally in a forward direction to the take-up spool 24. Since at this time the conductive strip 78 no longer prevents forward movement of the nozzle plate 90, the nozzle plate will be carried forwardly until (as shown in FIG. 5) the rear edge 94" of the nozzle opening 94 engages the rear edge of the depending sweeper portion 98 in the base of the processor. Because of the depending nature of the sweeper 98, any processing fluid remaining in the nozzle opening 94 will be swept back into the chamber 60. Simultaneously, the absorbent pad 96 on the upper surface of the nozzle plate will seal the opening 86 from the chamber 60 to prevent any residual processing fluid from leaking into the cassette interior.

As the nozzle plate 90 is carried forwardly, the pressure pad 64 is also advanced forwardly with the film strip but through a distance less than the distance through which the nozzle plate 90 is moved to effect closure of the opening 86 in the manner described above. Specifically, forward movement of the pressure pad 64 is limited by engagement of the rear edge of the notch 122 with the lugs 126. Continued movement of the nozzle plate 90 relative to the pressure pad 64 will cause the depending cam pair 130 to ride up on the ramp pair 134 causing the nozzle plate 90 and the pressure pad to be spaced from the film strip 26 in the manner shown in FIG. 5 of the drawings. Also at this time the spring end 118 drops into the notch 122 of the pressure pad 64. Because of the ledge 136 in the ramps 134, however, a measure of spring stress remains to effect an upward bias of the pressure pad and of the nozzle plate 90 through the depending cam portions 130. As a result of this residual bias, a tight sealing relationship is provided between the surface of the absorbent pad 96 and the opening 86 in the base 82 of the processor 40. Swelling of the pad 96 due to fluid engagement also enchances this tight sealing relation.

To insure forward movement of the nozzle plate and of the pressure pad 64 subsequent to processing in the manner described above, the film strip 26 at the take-up leader end thereof may be formed with a surface discontinuity providing means for displacing the nozzle assembly with film advancement forward. The discontinuity is in the nature of a projection 140 (see FIG. 4) designed to engage the rear edge of the inclined doctoring surface portion 110 to effect the momentary drag on the nozzle plate and pressure pad components. To avoid unnecessary pulling forces during exposure of the film strip in the camera, the film may be wound in the cassette such that the projection 140 is initially in advance of the nozzle plate 90 but drawn to the position shown in FIG. 4 upon rewind during processing. Once the pressure pad and nozzle plate components have achieved the positional interrelationship shown in FIG. 5, the surface discontinuity 140 will no longer be of any effect during subsequent projection cycles.

Figure 9:
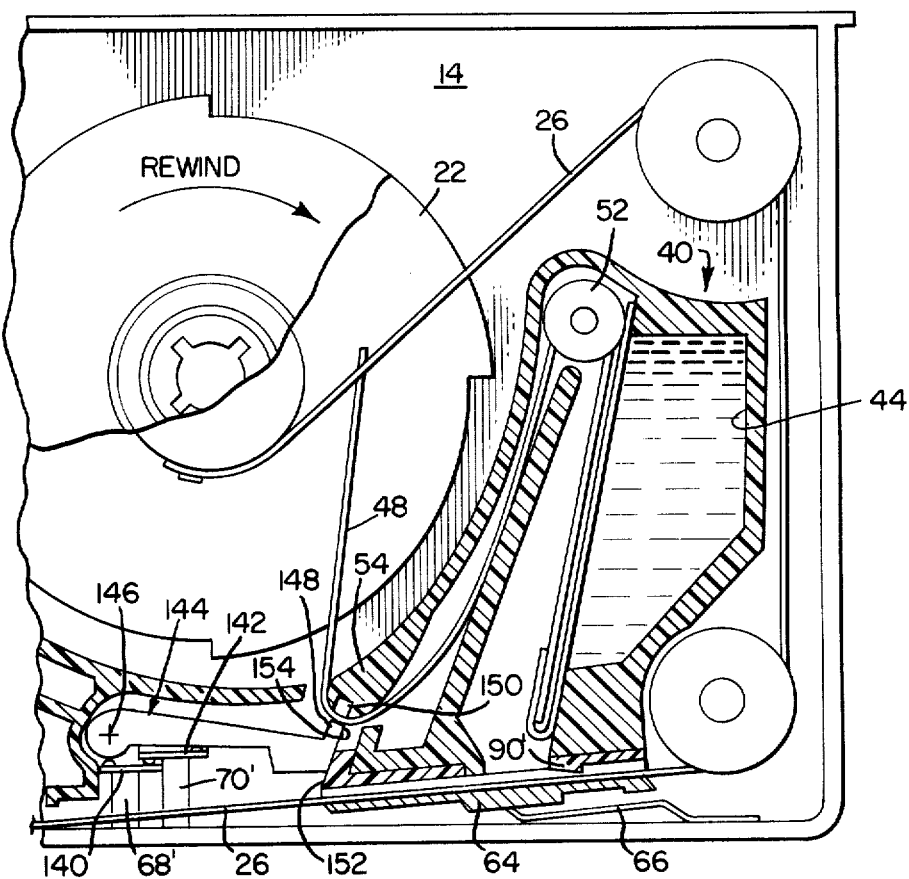
FIG. 9 is a cross-section through a multi-purpose film cassette incorporating an alternative embodiment of the present invention.
Figure 10:
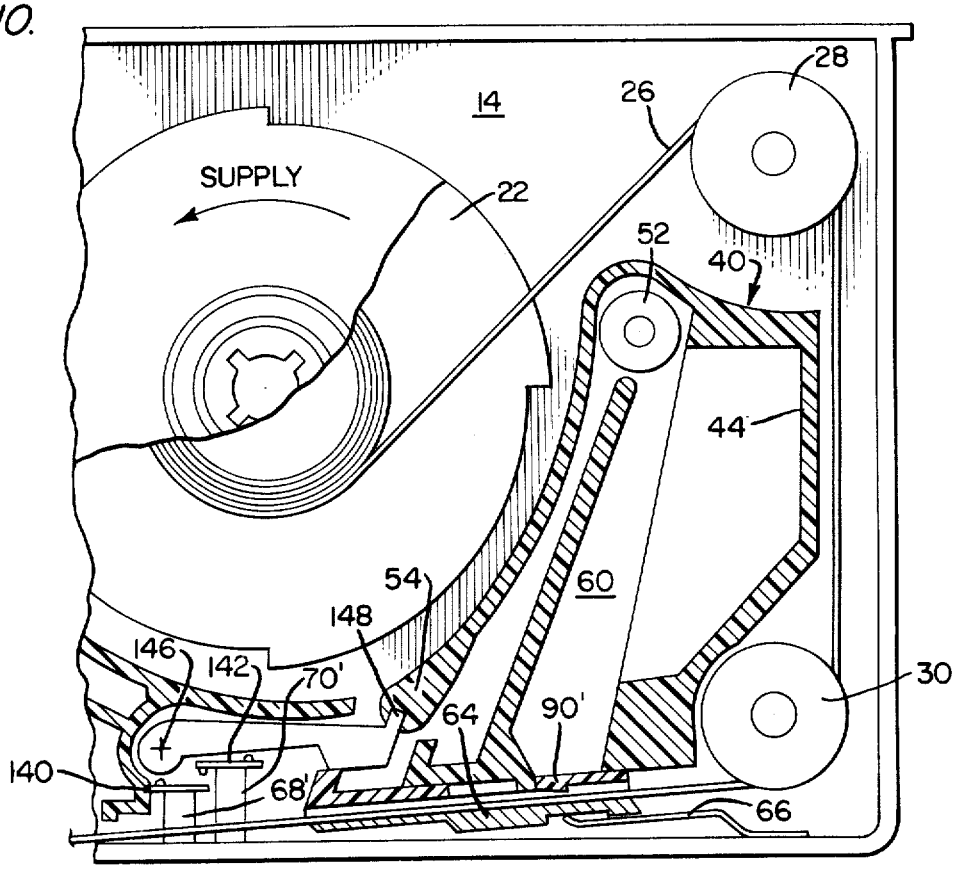
FIG. 10 is a fragmentary cross-section similar to FIG. 9 but illustrating the components in a different operating condition.

In the alternative embodiments of the invention illustrated in FIGS. 9–14, components designated by the reference numerals identified above are identical in structure and function to components in the embodiment of FIGS. 1–8. Turning first to FIGS. 9 and 10, components which serve the same function in both embodiments but differ in structure are designated in these figures by the same reference numerals but primed. It will be readily apparent therefore that the principal difference between the embodiment of FIGS. 9 and 10 and that of FIGS. 1–8 resides in the arrangement by which nozzle assembly is locked in its initial fluid deposit position and by which the terminals 68' and 70' are changed from a condition establishing a circuit continuity prior to processing to a condition establishing a circuit discontinuity during the processing cycle. Specifically, the terminals 68' and 70' are respectively provided with resilient contacts or contact ledges 140 and 142 extending from the rear wall 14 of the cassette housing inwardly under a lever arm 144 pivoted at one end on a transverse axis 146.

The rearwardly extending or free end of the lever arm 144 is provided with an upstanding tang 148 positioned opposite a recess or notch 150 in the radius portion 54 described above with respect to FIGS. 1–8. The tang 148 and notch 150 are of a width less than the width of the pull strip 48 so that movement of the tang into the notch 150 is initially prevented by the presence of the pull strip 48 in its initial condition. The lever arm 144 is urged by the terminals 68' and 70' towards the recess 150 such that withdrawal of the pull strip will permit the tang 148 to enter the recess 150 and, hence, the contact ledges assume their open circuit condition. Consequently, in this arrangement, the terminals 68' and 70' provide a spring bias which urges the contact ledges 140 and 142 towards a separated or open condition, the latter being held in a closed position by the lever arm 144. As indicated, actuation of the pull tab 48 releases the lever arm 144 so that the contacts will assume an open condition.

The forward edge of the nozzle plate 90' in the embodiment of FIGS. 9 and 10 is shaped to provide an upwardly and rearwardly inclined ramp 152 in engagement with the rear surface 154 of the lever arm 144. In light of this organization, it will be seen that forward movement of the nozzle plate 90' out of its expose-process positional relationship, as shown in FIG. 9, is prevented by the rear face of the lever arm 154 in turn retained by the presence of the pull strip 48. When the pull strip 48 is removed at the initiation of the processing cycle, the lever arm 144 is biased upwardly by the contacts 140 and 142. Then forward movement of the film strip during the first ensuing projection cycle, which draws the nozzle plate 90' forwardly, also tends to cam the free end of the lever arm 144 upwardly so that the tang 148 remains in engagement with the notch 150 and allows the nozzle plate 90' to advance to the position shown in FIG. 10. In this position, the lever arm 144 is held in an upwardly pivoted condition which in turn retains the contact ledges 140 and 142 of the terminals 68' and 70' out of contact with each other. Accordingly, the condition of the terminals 68' and 70' is changed from one providing circuit continuity during exposure and processing cycles to one providing a circuit discontinuity subsequent to completion of the processing of the film strip. The operation of the embodiment of FIGS. 9 and 10 is similar in all other respects to the embodiment of FIGS. 1-8 and, accordingly, further description of such operation is deemed unnecessary herein.

Turning now to the embodiments shown in FIGS. 11-14, which are directed to spacing of the pressure pad following processing, it should first be noted that the embodiment of FIGS. 3-8 require relative longitudinal movement between the pad 64 and the nozzle plate 90 and a relatively large force thereon, which is developed from a film discontinuity such as a film bump (not shown). It is preferable, however, to eliminate such a discontinuity, which can interface with cassette operations, and to effect spacing of the pad, or, that is, film release following processing by solely utilizing the clamping forces developed on the film by means of the pad spring 66.

Figure 11:
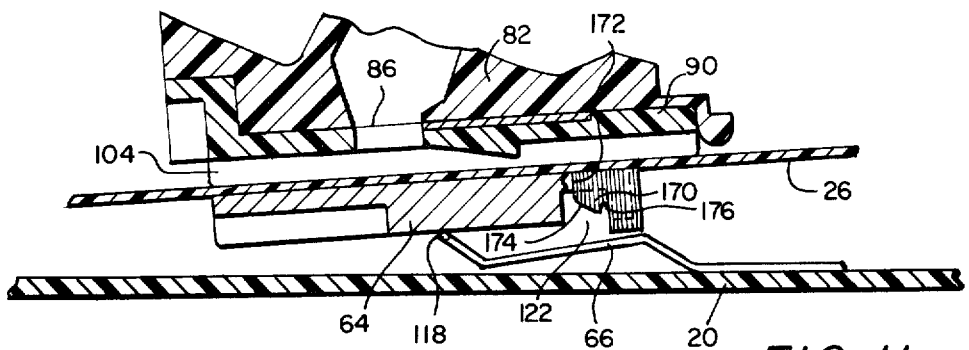
FIG. 11 is a cross-section illustrating an alternate embodiment of the nozzle plate and pressure pad assembly of the present invention.
Figure 12:
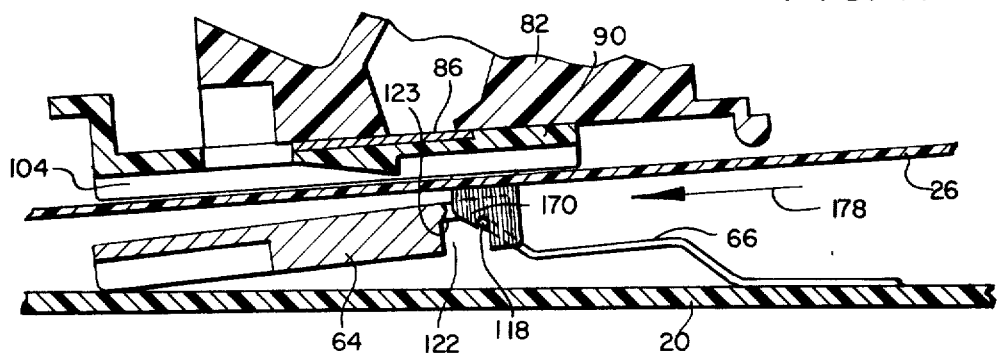
FIG. 12 is a cross-section similar to FIG. 11 but illustrating the components in their post-processing position.

FIGS. 11 and 12 illustrate one embodiment wherein the pad 64 and the plate 90 are keyed together for simultaneous longitudinal movement. In this arrangement, the plate 90 includes a pair of depending side lugs, only one of which is shown at 170, which straddle the film 26 and extend through a pair of side notches designated at 172. In this embodiment the lugs 170 also extend into a bottom notch or indentation 122 of the pad 64 and carry, at their distal end, a cam surface 174 and a spring receiving recess or indent 176.

Initially, as illustrated in FIG. 11, the nozzle plate 90 is retained in a fluid depositing position beneath the processor base 82 by means of the pull tab or contact lever arm as described in the earlier embodiments. Upon withdrawal of the pull strip, the nozzle plate is free to move to the left as viewed in FIG. 11, or, that is, in an expose-project or forward direction. Consequently, upon completion of the process rewind and initiation of forward advancement of the film 26 in the direction shown by the arrow 178 in FIG. 12, the plate 90 and the pad 64 (which are in clamping engagement with the film) are carried with the film. This displacement of the plate 90 and the pad 64 allows the laterally extended end 118 of the spring 66 to drop into the bottom notch 122 where it rides on the cam surface 174 of the lug 170 into recess 176. The latter being located lower than the upper surface 123 of the bottom notch 122 allows the pad 64 to drop down to rest on the spring end 118 and the bottom cassette wall 20. This releases the film 26 from engagement with the pad 26 and the plate side walls 104 and 106 so as to automatically provide unimpeded passage of the film through the proceeding station responsive to forward film movement following process actuation. Hence, it should be understood that the spring 66 and lug 170 provide means for locking the plate 90 in its closed nozzle position while the spring in conjunction with the pad recess 122 provide means for releasing the pad to a film disengaged position.

Figure 13:
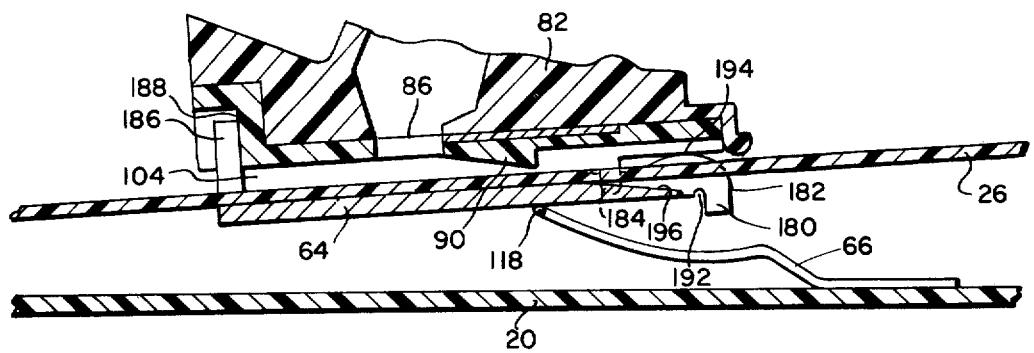
FIG. 13 is a cross-section of still another embodiment of the nozzle plate and pad assembly of the invention.
Figure 14:
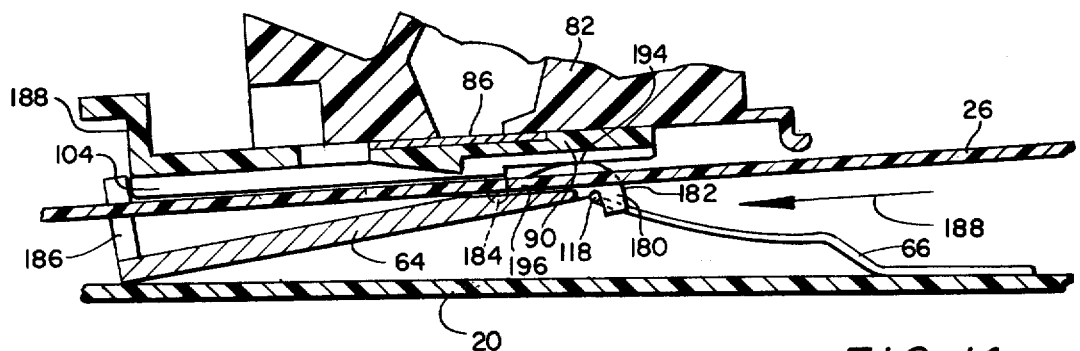
FIG. 14 is a cross-section similar to that of FIG. 13 but illustrating the components in their post-processing position.

In a slightly different arrangement, shown in FIGS. 13 and 14, the pad 64 following processing is rocked downwardly to free the film by means of a cam surface 180 carried at the trailing end 182 of the pad. Like the embodiment of FIGS. 11 and 12, the nozzle plate 90 and the pad 64 are longitudinally keyed together by a pair of depending studs, only one of which is shown at 184, which extend respectively into recesses or side notches (not shown) of the pad 64. At its opposite end, the pad 64 carries a pair of upwardly extending lugs, only one of which is shown at 186, which engage the leading edge 188 of the nozzle plate 90 so as to insure synchronous longitudinal displacement of both. The pressure pad 64 carries a spring receiving recess or indent 192 which is located slightly rearwardly (towards the trailing end 182 of the pad) of the point 194 of contact between the cam 180 and the nozzle plate 90. Consequently, reception of the transverse spring end 118 in the recess 192 forces the trailing edge of the cam into plate contact and hence rotates the pad into a stable position inclined against the cassette base 20. To insure film clearance when the pad is in its rotated position, the trailing end 182 is inclined or offset as designated at 196 below the film engaging the surface 198 of the pad.

In this arrangement, like the embodiment of FIGS. 11 and 12, the plate 90 and the pad 64 are jointly displaced in a forward film advancement direction (to the left as viewed in FIG. 14) shown by the arrow 188 when film movement is reversed at the completion of processing. Again, this displacement results solely from the clamping pressure force on the film. To insure such movement, the leading end of the film may be roughened or stippled slightly. During this displacement, the pad 64 is carried across the spring end 118. This relative displacement with respect to the spring causes pad rotation as the spring end passes beneath the initial point 194 of cam-plate contact. When the plate reaches its closed position, blocking the processor orifice 86 as shown in FIG. 14, the spring end 118 drops into the recess 192 to lock the plate 90 and pad 64 in their film disengaged position. Hence, in this embodiment, the spring 66 in cooperation with the pad notch 192 provide means for retaining the plate in its closed position and both the plate and pad in film disengagement.

Thus it will be appreciated that by this invention there is provided a novel and highly effective processing unit for multi-purpose film cassettes of the type in which a photographic film strip is exposed, processed and projected without removal from the cassette and by which the above-mentioned objectives are completely fulfilled. Also it is contemplated that changes and/or modifications in the disclosed embodiments may be made without departure from the present invention. Accordingly, it is expressly intended that the foregoing description is illustrative of preferred embodiments only, not limiting, and that the true spirit and scope of the present invention be determined by reference to the appended claims.

What is claimed is:

1. A photographic film cassette for use with other apparatus, said cassette configured for depositing a coating of processing fluid on a moving run of a cassette retained photographic film strip to develop images thereon, said cassette comprising:
    a cassette housing;
    means for cooperating with the other apparatus for advancing and guiding said film strip along a given path within said cassette housing;
    means actuatable for depositing processing fluid on the advancing film strip; and
    means for actuating said depositing means and for indicating to the other apparatus the processed condition of the film strip, said means for actuating and indicating including an actuating member mounted for displacement from an initial position wherein said depositing means is inoperative to another position wherein said depositing means is rendered operative, a pair of spaced apart conductive terminals, and a conductive element coupled to said actuating member and displaceable therewith between one position in bridging connection with said conductive terminals and another position wherein said conductive element is in unbridging connection thereto so as to alter the conductive condition across said terminals between a closed and an open condition in accordance with displacement of said actuating member thereby indicating to said other apparatus that said processing condition has been initiated.

2. The cassette of claim 1 wherein said conductive element comprises a contact member mounted for displacement between a first position wherein said conductive element is in bridging connection with said conductive terminals and a second position wherein said contact member is in unbridging connection therewith and said actuating and indicating means additionally includes means for biasing said contact member towards one of its said positions, and said actuating member engages said contact member so as to preclude displacement thereof to its said one position when said actuating member is located in its said initial position and is disengaged from said contact member so as to permit displacement thereof to its said one position under the force of said biasing means when said actuating member is displaced from its said initial position thereby altering the conductivity between said conductive terminals.

3. The cassette of claim 1 wherein said means for depositing processing fluid includes a chamber configured for initially retaining a quantity of processing fluid, said actuating member comprises a pull strip coupled to said chamber and configured for releasing the fluid therefrom responsive to longitudinal displacement of said pull strip from an initial position, said conductive element includes a contact member mounted for displacement from a first position wherein said contact member is in bridging connection to said conductive terminals and a second position wherein said contact member is not in said bridging connection, and said actuating and indicating means additionally including means for biasing said contact member away from its said first position, and said pull tab is initially located in engagement with said contact member and configured for precluding displacement of said contact member from its said first position, so that upon displacement of said pull strip, said contact member is released and subsequently displaced under the force of said biasing means to its said second position to provide an open condition between said conductive terminals.

4. The cassette of claim 1 wherein said depositing means includes a chamber for initially retaining a quantity of processing fluid, said actuating member comprises an elongated pull strip configured for releasing the fluid from said chamber responsive to longitudinal displacement of said pull strip from an initial position, said conductive element comprises a short conductive portion of said pull strip forming a contact member configured for displacement with said pull strip, and said actuating and indicating means further including means for locating said pull strip in its said initial position with said contact member in bridging connection to said conductive terminals and so that upon longitudinal displacement of said pull strip said contact member is removed from said bridging connection to said conductive terminals.

5. The cassette of claim 1 wherein said depositing means includes a chamber configured to initially retain a quantity of processing fluid and means for receiving said quantity of processing fluid and means for receiving said quantity of processing fluid when it is released from said chamber, said receiving means including an opening through which the processing fluid may pass to said film strip, said depositing means additionally including means for blocking said opening following deposit of the coating of processing fluid, said blocking means including a blocking member and means for mounting said blocking member for displacement across said opening from a first position wherein it is in unblocking relation to said opening and a second position where it is in blocking relation thereto, and said actuating member being configured when in its said initial position for precluding displacement of said blocking member to its said blocking position so as to thereby prevent premature blocking of said opening prior to release of the processing fluid.

6. The cassette of claim 5 wherein said other apparatus is configured for advancing said film strip in a first direction for coating of said film strip and subsequently in an opposite direction, and said means for mounting said blocking member includes means for mounting said blocking member for movement in the direction of and generally parallel to advancement of said film strip in its said opposite direction so that said blocking member when released is displaceable from its said first unblocking to its said second blocking position responsive to movement of said film strip in its said opposite direction.

7. An applicator for depositing a coating of processing fluid on a moving run of a photographic film strip, the applicator comprising:
    a first chamber for initially retaining a quantity of processing fluid;
    a second chamber for receiving the processing fluid when released from said first chamber, said second chamber including an exterior surface having an opening therein through which the processing fluid may pass from said second chamber to the film strip;

selectively operative means for blocking said opening following deposit of the coating of processing fluid; said blocking means including a blocking member; means for mounting said blocking member for displacement across said chamber opening from a first position wherein said blocking member is in unblocking relation to said chamber opening to a second position wherein said blocking member is in blocking relation thereto; and selectively operative means for releasing the processing fluid from said first chamber to said second chamber, said releasing means including means for precluding displacement of said blocking member from its said first position prior to operation of said releasing means to release the processing fluid.

8. The applicator of claim 7 wherein said blocking means includes a nozzle plate having an opening therein, said nozzle plate being disposed between said chamber exterior surface and the film strip and configured for displacement in a given direction from a first position wherein said plate opening is in substantial alignment with said chamber opening and a second position wherein said plate opening is out of alignment therewith, and said given direction of displacement being configured for displacing a trailing edge of said plate opening across said chamber opening, and said plate including an absorbent pad having an area exceeding the area of said chamber opening, said pad being located at the trailing edge of said plate opening and on the plate surface adjoining said chamber exterior surface so that said pad is carried into blocking relation with said chamber opening when said plate is displaced to its said second position.

9. The applicator of claim 7 for coating the film strip when the moving run thereof is in a given direction and wherein said blocking means includes a nozzle plate having a plate opening therein, means for mounting said plate between and in engagement with both said chamber exterior surface and the run of film for movement along a plate axis parallel to the longitudinal axis of the moving run of film from a first position wherein said plate opening is in at least partial alignment with said chamber opening to a second position wherein said plate opening is not in alignment therewith, stop means for precluding movement of said plate in said given direction along said plate axis from said first position, and said releasing means including means for precluding movement of said plate in a direction opposite said given direction prior to operation of said releasing means so that said plate is initially retained in said first position between said stop means and said releasing means and following operation of said releasing means is then biased against said stop means so as to be maintained in said first position by the movement of the film across said plate in said given direction.

10. The applicator of claim 9 additionally including a pressure pad, means for biasing said pad toward said plate with said film strip passing therebetween such that, when said strip is advanced in said given direction, progressive portions thereof are biased into engagement with said plate and, when said strip is subsequently advanced in said opposite direction following operation of said releasing means, said plate and pad are thereby displaced to their projection positions, and said plate and pad including cooperative means for displacing said pad in a substantially perpendicular direction away from said plate a distance greater than the thickness of the film strip so as to allow free passage thereof between said pad and plate.

11. The applicator of claim 7 wherein said blocking means includes a nozzle plate having a plate opening therein, means for mounting said plate between said chamber exterior surface and the moving run of film for movement of said plate in a given direction across said chamber opening from a first position, wherein said plate opening is at least in partial alignment with said chamber opening and permits passage of the fluid to the film strip, to a second position, wherein said plate opening is out of alignment with said chamber opening and said plate blocks said chamber opening, and said and said applicator additionally includes a sweeper member extending from one edge of said second chamber into said plate opening, said sweeper member being mounted on said second chamber such that when said plate is in its said first position, said sweeper member adjoins the leading edge of said plate opening as viewed with respect to movement of said plate in said given direction, and said sweeper member extends substantially across the lateral width of said plate opening such that as said plate is displaced in said given direction, the trailing edge of said plate opening is moved toward said sweeper member and said sweeper member thereby tends to sweep the fluid from said plate opening.

12. A photographic film cassette for use with other apparatus for initially advancing a cassette retained film strip in a given forward direction while recording images thereon, then in a rewind direction opposite said forward direction while coating said film strip with processing fluid, and subsequently again in said forward direction, said cassette comprising:

a housing;
a chamber for receiving said processing fluid, said chamber having an exterior surface including a chamber opening therein through which said received processing fluid may pass from said chamber;
a nozzle plate having a plate opening therein;
means for mounting said plate in adjoining relation to said chamber surface for movement along a given axis from a first position wherein said plate opening is at least in partial alignment with said chamber opening to permit passage of said fluid to a second position wherein said plate opening is out of alignment with said chamber opening to thereby block fluid passage therethrough;
means responsive to the other apparatus for advancing said film strip in either of said directions and for guiding said film strip within said cassette housing along a given path with one major surface of said film strip traversing said nozzle plate in a direction parallel to said given axis;
a film support pad located in adjoining relation to said plate with an intervening portion of said film strip interposed therebetween;
means for coupling said pad to said plate for partial movement therewith along said given axis from a first position to a second position;
means when said pad is in its said first position for biasing said pad toward said plate so as to sandwich said intervening portion of film between said pad and plate;
means for holding said plate in its said first position, during said initial advancement of said film strip, and for releasing said plate, prior to said subsequent advancement of said film strip, for movement therewith to its said second position in response to said subsequent advancement; and means responsive to displacement of said plate and pad toward their said second positions for displacing said pad substantially perpendicularly away from said plate by a distance exceeding the thickness of said film strip to thereby allow free passage of said film strip between said pad and plate for cassette operation subsequent to coating of said film strip with processing fluid.

13. The cassette of claim 12 additionally including means for storing a quantity of processing fluid, and said means for holding and releasing said plate additionally includes means for releasing said fluid from said storing means to said chamber.

14. The apparatus of claim 12 wherein said biasing means additionally includes means for retaining said plate and said pad in their said second positions following displacement thereof.

15. The apparatus of claim 12 wherein said biasing means includes a spring member located in biasing engagement with the underside of said pad when said pad is located in its said first position, and said plate and pad respectively include a notch in the undersides thereof configured to receive said spring when said pad and plate are displaced to their respective second positions so as to prevent return of said plate and pad to their first position during subsequent cassette operations.

16. The apparatus of claim 12 wherein said means for displacing said pad away from said plate includes cam means for camming said pad away from said plate as said plate is moved to its said second position.

17. The apparatus of claim 12 wherein said plate is displaced longitudinally along said given axis a given distance between its said first and second positions, said pad is restricted at least from longitudinal movement over as great a distance as said given distance so as to provide relative movement of said plate over said pad, and said means for displacing said pad away from said plate includes a cam member interposed between said plate and pad and operative to displace said pad away from said plate responsive to said relative movement.

18. The apparatus of claim 12 additionally including means for coupling said pad to said plate so as to at least partially displace said pad from its said first position in a direction parallel to the direction of displacement of said plate, when said plate is moved from its said first to its said second position, and said biasing means includes a spring member located in biasing engagement with said pad, and said means for displacing said pad away from said plate includes means responsive to movement of said plate and pad across said spring member as said plate and pad are respectively moved from their said first positions for pivoting said pad into its said displaced position away from said plate.

19. The apparatus of claim 18 wherein said spring bears on a given point on the underside of said pad, said rocking means includes a curved surface located between said pad and plate at a point spaced rearwardly of said given point as measured in the direction of movement of said pad and plate so that as said pad and plate are moved over said spring from their respective said first positions, the bearing point of said spring against said pad is shifted to beneath said curved surface so as to cause said pad to rotate around said curved surface in a direction where the leading edge of said pad is displaced away from said plate.

20. The cassette of claim 12 additionally including a reservoir in communication with said chamber, said reservoir being configured for storing a quantity of processing fluid, a pull strip coupled to said reservoir and configured for releasing the fluid therefrom to said chamber responsive to longitudinal displacement of said pull strip, and means for initially locating at least a portion of said pull strip in blocking relation to said plate so as to preclude movement of said plate to its said second position prior to displacement of said pull strip to release the fluid.

21. A processor for a multi-purpose cassette containing a strip of photographic film during exposure, processing and projection, said processor being operative to deposit a uniform coating of processing fluid on a moving run of said film strip after exposure and comprising:

means for defining an initially sealed reservoir of processing fluid having an exterior surface with a reservoir opening therein configured to pass processing fluid from said reservoir to the film strip when the fluid is released from said reservoir;

a nozzle plate having a nozzle opening therein;

means for mounting said plate with one major surface in engagement with said exterior reservoir surface and its other major surface overlying said film strip for slideable movement relative to said exterior reservoir surface from a processing position in which said nozzle opening is at least partially aligned with said reservoir opening to a projection position in which said plate opening is out of alignment therewith such that said plate blocks said reservoir opening;

a pressure pad underlying said film strip and said nozzle plate whereby said run of said film strip passes between said nozzle plate and said pressure pad;

means for supporting said pressure pad for movement from a processing position in which said pad is yieldably biased against said film strip and said nozzle plate to a projection position in which said pressure pad is spaced from said nozzle plate by a distance greater than the thickness of said film strip to thereby allow free passage of said film strip between said nozzle plate and said pressure pad subsequent to film strip exposure and processing; and selectively operative means for releasing said fluid from said reservoir and for retaining said plate and pad in their respective processing positions prior to release of the fluid, said releasing and retaining means including means displaceable from an initial position wherein said reservoir is sealed and said plate and pad are retained in their said processing positions to a subsequent position where said fluid is released from said reservoir and said plate and pad are released for movement to their projection positions.

22. The apparatus recited in claim 21 wherein said releasing and retaining means comprises removable strip means attachable to said film strip upon reverse movement thereof after exposure and prior to processing, said strip means initially overlying a notched wall portion within the cassette, and means including a portion of said nozzle plate configured for advancement, responsive to displacement of said plate from its said processing portion, into said notched wall portion after removal of said strip means.

23. The apparatus recited in claim 21 wherein said releasing and retaining means comprises a pull strip configured responsive to displacement of said pull strip for releasing processing fluid initially sealed within said reservoir, and a conductive strip secured to said pull strip, the cassette including a pair of terminals extending from within the cassette to the exterior thereof, and said conductive strip initially interconnects said pair of terminals to establish a circuit continuity between said terminals prior to displacement of said conductive strip and to establish a circuit discontinuity between said terminals upon displacement of said conductive strip at the initiation of processing.

24. The apparatus recited in claim 21 wherein said releasing and retaining means comprises a notched wall portion of said cassette, a pull strip for releasing processing fluid initially sealed within said reservoir upon displacement of said pull strip from an initial position, said pull strip initially overlying and substantially blocking the entrance to said notched wall portion, an arm movable from a first position in engagement with said plate, thereby preventing movement of said nozzle plate during exposure, to a second position at least partially received within said notch means and disengaged from said nozzle plate thereby allowing movement of said nozzle plate and said pressure pad to their said projection positions and means for biasing said arm towards its said second position so that initially said arm is biased into engagement with said pull strip and upon displacement thereof is moved into said notched wall portion thereby releasing said nozzle plate for subsequent displacement.

25. The apparatus recited in claim 24 additionally including a pair of terminals mounted within the cassette and extending to the exterior thereof, said terminals including a conductive portion located in a contact position providing a condition of electrical conduction between said terminals and means for biasing said portion out of said contact position so as to disrupt said conduction, and wherein said arm retains said portion in its said contact position when said arm is in its said first position and releases said portion from its said contact position to provide a circuit discontinuity between said terminals upon movement of said arm to its said second position.

26. The apparatus recited in claim 21 wherein said nozzle plate is formed having a pair of longitudinal runners projecting from said other major surface to slidingly engage the longitudinal margins of said film strip, said pad including spaced ramp members and said nozzle plate is provided further with cam members projecting past the margins of said film strip into engagement with said ramp members, said cam and ramp members being cooperable upon movement of said nozzle plate and pressure pad to their said projection positions to perpendicularly displace said pressure pad from said nozzle plate runners by a distance greater than the thickness of said film strip.

27. The apparatus recited in claim 26 wherein said means for supporting said pressure pad comprises a spring biasing said pressure pad toward said film strip and said nozzle plate and means to establish said pressure pad projection position in advance of said nozzle plate projection position thereby to effect, during plate and pad displacement, relative longitudinal movement between said nozzle plate and said pressure pad to effect such cooperation between said cam means and said ramp means.

28. An applicator operative to deposit a coating of processing fluid on a moving run of a photographic film strip, the applicator comprising a chamber having an exterior surface including a chamber opening therein through which the processing fluid may pass to the film strip, a plate member having an opening therein, means for mounting said plate member between said chamber exterior surface and the moving run of film for movement of said plate member in a given direction from a first position, wherein said plate opening is in at least partial alignment with said chamber opening, to a second position, wherein said plate opening is out of alignment therewith, and means for sweeping the fluid from said plate opening as said plate member is displaced from its said first position to its said second position.

29. The applicator of claim 28 wherein said means for sweeping comprises a sweeper member extending from one edge of said chamber into said plate opening, said sweeper member being mounted on said chamber such that when said plate is in its said first position, said sweeper member adjoins the leading edge of said plate opening as viewed with respect to movement of said plate in said given direction, and said sweeper member extends substantially across the lateral width of said plate opening such that as said plate is displaced in said given direction, the trailing edge of said plate opening is moved toward said sweeper member and said sweeper member thereby tends to sweep the fluid from said plate opening.

* * * * *